United States Patent
Jeon et al.

(10) Patent No.: US 12,327,178 B2
(45) Date of Patent: Jun. 10, 2025

(54) NEURAL NETWORK ACCELERATOR CONFIGURED TO PERFORM OPERATION ON LOGARITHM DOMAIN

(71) Applicant: ELECTRONICS AND TELECOMMUNICATIONS RESEARCH INSTITUTE, Daejeon (KR)

(72) Inventors: In San Jeon, Daejeon (KR); Chan Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1007 days.

(21) Appl. No.: 17/238,490

(22) Filed: Apr. 23, 2021

(65) Prior Publication Data

US 2021/0334635 A1   Oct. 28, 2021

(30) Foreign Application Priority Data

Apr. 24, 2020  (KR) .................. 10-2020-0049817

(51) Int. Cl.
*G06N 3/063* (2023.01)
*G06N 3/045* (2023.01)

(52) U.S. Cl.
CPC ............. *G06N 3/063* (2013.01); *G06N 3/045* (2023.01)

(58) Field of Classification Search
CPC ........ G06N 20/00; G06N 20/10; G06N 20/20; G06N 3/02; G06N 3/045; G06N 3/047; G06N 3/063; G06N 3/08; G06N 3/0985
See application file for complete search history.

(56) References Cited

U.S. PATENT DOCUMENTS

| 6,772,389 B2 | 8/2004 | Kim et al. |
| 7,571,203 B2 | 8/2009 | Jeon et al. |

(Continued)

FOREIGN PATENT DOCUMENTS

| KR | 100365724 B1 | 12/2002 |
| KR | 20050061754 A | 6/2005 |

(Continued)

OTHER PUBLICATIONS

Arnab Sanyal et al., "Neural Network Training With Approximate Logarithmic Computations", arXiv:1910.09876v1, Oct. 22, 2019.
Daisuke Miyashita et al., "Convolutional Neural Networks using Logarithmic Data Representation", arXiv:1603.01025v2, Mar. 17, 2016.

(Continued)

*Primary Examiner* — Shane D Woolwine
(74) *Attorney, Agent, or Firm* — Rabin & Berdo, P.C.

(57) ABSTRACT

Disclosed is a neural network accelerator including a maximum value determiner outputting a maximum value based on a first magnitude component corresponding to first input data and a second magnitude component corresponding to second input data, a sign determiner outputting a sign component corresponding to the maximum value among a first sign component corresponding to the first input data and a second sign component corresponding to the second input data, as an output sign component, an offset operator quantizing a difference between the first magnitude component and the second magnitude component and outputting an output offset based on the first sign component, the second sign component, and the quantization result, and a magnitude operator calculating an output magnitude component of an output data based on the maximum value and the output offset. Each of the first input data and the second input data is data on a logarithm domain.

12 Claims, 7 Drawing Sheets

(56) References Cited

U.S. PATENT DOCUMENTS

| | | |
|---|---|---|
| 7,848,464 B2 | 12/2010 | Hwang et al. |
| 10,929,746 B2 | 2/2021 | Litvak et al. |
| 2012/0166501 A1 | 6/2012 | Sokolov et al. |
| 2018/0129935 A1 | 5/2018 | Kim et al. |
| 2018/0197084 A1 | 7/2018 | Kim et al. |
| 2018/0341857 A1* | 11/2018 | Lee ................. G06N 3/084 |
| 2020/0243102 A1* | 7/2020 | Schmidt ............. G10L 19/005 |
| 2020/0281570 A1* | 9/2020 | Sato ................. G01S 7/52028 |

FOREIGN PATENT DOCUMENTS

| | | |
|---|---|---|
| KR | 100580843 B1 | 5/2006 |
| KR | 20070092867 A | 9/2007 |
| KR | 20190062129 A | 6/2019 |

OTHER PUBLICATIONS

Insan Jeon et al., "An Implementation Algorithm for Reducing CNN Complexity of YOLOv3", IEIE, 2019, pp. 179-180.

Joseph Redmon et al., "YOLOv3: An Incremental Improvement", arXiv:1804.02767v1 [cs.CV] Apr. 8, 2018.

Jung-Fu Cheng et al, "Linearly Approximated Log-MAP Algorithms for Turbo Decoding", VTC2000—Spring. 2000 IEEE 51st Vehicular Technology Conference Proceedings (Cat. No. 00CH37026), May 15-18, 2000.

Song Han et al., "Deep Compression: Compressing Deep Neural Networks With Pruning, Trained Quantization and Huffman Coding", ICLR, 2016, pp. 1-14.

Yong-Deok Kim et al., Compression of Deep Convolutional Neural Networks for Fast and Low Power Mobile Applications, ICLR, 2016, pp. 1-16.

\* cited by examiner

NEURAL NETWORK ACCELERATOR CONFIGURED TO PERFORM OPERATION ON LOGARITHM DOMAIN

CROSS-REFERENCE TO RELATED APPLICATIONS

This application claims priority under 35 U.S.C. § 119 to Korean Patent Application No. 10-2020-0049817 filed on Apr. 24, 2020, in the Korean Intellectual Property Office, the disclosures of which are incorporated by reference herein in their entireties.

BACKGROUND

Embodiments of the present disclosure described herein relate to a deep neural network (DNN), and more particularly, relate to a neural network accelerator configured to perform an operation on a logarithm domain.

DNN is widely used in various application fields such as computer processing, speech recognition, image recognition, or the like. With the development of a technical field associated with the DNN, the amount of computation and the amount of memory required by the DNN are quickly increasing. An increase in the amount of computation and the amount of memory may result in an increase in hardware resources. In other words, the DNN relieves the burden of feature engineering by human experts, but the additional burden for optimizing the amount of computation and hardware of the DNN is increasing.

SUMMARY

Embodiments of the present disclosure provide a neural network accelerator configured to perform an operation on a logarithm domain with improved performance and reduced cost.

According to an embodiment, a neural network accelerator includes a maximum value determiner outputting a maximum value based on a first magnitude component corresponding to first input data and a second magnitude component corresponding to second input data, a sign determiner outputting a sign component corresponding to the maximum value among a first sign component corresponding to the first input data and a second sign component corresponding to the second input data, as an output sign component, an offset operator quantizing a difference between the first magnitude component and the second magnitude component and outputting an output offset based on the first sign component, the second sign component, and the quantization result, and a magnitude operator calculating an output magnitude component of an output data based on the maximum value and the output offset. Each of the first input data and the second input data is data on a logarithm domain.

In an embodiment, the neural network accelerator may further include a complement generation unit generating a complement of third input data and a first multiplexer selecting one of the third input data and the generated complement as the second input data in response to a subtraction signal.

In an embodiment, the offset operator includes a minimum value determiner outputting a minimum value among the first magnitude component and the second magnitude component, a first integer separation unit outputting a first integer and a first decimal based on a difference between the minimum value and the maximum value, a first quantization unit outputting a first quantization value by saturating and quantizing the first integer and the first decimal, a first lookup table outputting a first offset value corresponding to the first quantization value, a second quantization unit outputting a second quantization value by saturating and quantizing the first integer and the first decimal, a second lookup table outputting a second offset value corresponding to the second quantization value, and an offset selector outputting one of the first offset value and the second offset value as the output offset based on a comparison result between the first sign component and the second sign component by the sign determiner.

In an embodiment, the first offset value and the second offset value are represented by Equation 1.

$$OS_1 = \log_2 1 + 2^{Q_1}$$

$$OS_2 = \log_2 1 - 2^{Q_2} \qquad \text{[Equation 1]}$$

In the Equation 1, $OS_1$ denotes the first offset value. $Q_1$ denotes the first quantization value. $OS_2$ denotes the second offset value. $Q_2$ denotes the second quantization value.

In an embodiment, the offset selector selects the first offset value as the output offset when the first sign component is identical to the second sign component. The offset selector selects the second offset value as the output offset when the first sign component is different from the second sign component.

In an embodiment, the offset operator includes a minimum value determiner outputting a minimum value among the first magnitude component and the second magnitude component, a first operating unit generating a first intermediate value based on a difference between the minimum value and the maximum value, a second operating unit generating a first offset value based on the first intermediate value, a third operating unit generating a second offset value based on the first intermediate value, and an offset selector outputting one of the first offset value and the second offset value as the output offset based on a comparison result between the first sign component and the second sign component by the sign determiner.

In an embodiment, the first operating unit includes a first integer separation unit outputting a first integer and a first decimal based on a difference between the minimum value and the maximum value, a first quantization unit outputting a first quantization value by quantizing the first decimal, a first lookup table outputting a first value corresponding to the first quantization value, and a bit shifter outputting the first intermediate value by performing bit-shift on the first value based on the first integer. The first value is represented by Equation 2.

$$V_1 = 2^{-|A_M - B_M|} \qquad \text{[Equation 2]}$$

In the Equation 2, $V_1$ is the first value. $A_M$ is the first magnitude component. $B_M$ is the second magnitude component.

In an embodiment, the second operating unit includes a second integer separation unit outputting a second integer and a second decimal based on a sum of the first intermediate value and '1', a second quantization unit outputting a second quantization value by quantizing the second decimal, a second lookup table outputting a first intermediate offset value based on the second quantization value, and a first multiplexer outputting one of the first intermediate offset value and '1' as the first offset value based on the second integer.

In an embodiment, the first multiplexer selects and outputs the '1' as the first offset value when the second integer is '1'. The first multiplexer selects and outputs the first intermediate offset value as the first offset value when the second integer is '0'.

In an embodiment, the third operating unit includes a third integer separation unit outputting a third integer and a third decimal based on a difference between the first intermediate value and '1', a third quantization unit outputting a third quantization value by quantizing the third decimal, a third lookup table outputting a second intermediate offset value based on the third quantization value, and a second multiplexer outputting one of the second intermediate offset value and '0' as the second offset value based on the third integer.

In an embodiment, the second multiplexer selects and outputs the second intermediate offset value as the second offset value when the second integer is '1'. The second multiplexer selects and outputs the '0' as the second offset value when the second integer is '0'.

According to an embodiment, a neural network accelerator includes a log converter converting real number data on a real domain into log data on a logarithm domain and an operation circuit converting a multiplication operation on the real domain and a division operation on the real domain for the real number data into logarithmic addition and logarithmic subtraction for the log data and to convert addition on the real domain for the real number data into Jacobian logarithmic addition for the log data. The operation circuit includes a Jacobian logarithmic adder performing the Jacobian logarithmic addition. The Jacobian logarithmic adder includes a maximum value determiner outputting a maximum value based on a first magnitude component corresponding to first log data and a second magnitude component corresponding to second log data, a sign determiner outputting a sign component corresponding to the maximum value among a first sign component corresponding to the first log data and a second sign component corresponding to the second log data, as an output sign component, an offset operator quantizing a difference between the first magnitude component and the second magnitude component and outputting an output offset based on the first sign component, the second sign component, and the quantization result, and a magnitude operator calculating an output magnitude component of an output data based on the maximum value and the output offset.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure may be described in detail and clearly to such an extent that an ordinary one in the art easily implements the present disclosure.

Hereinafter, "unit", "module", "layer", or functional blocks illustrated in drawings may be implemented in the form of software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Also, unless differently defined, all terms used herein, which include technical terminologies or scientific terminologies, have the same meaning as that understood by a person skilled in the art to which the present disclosure belongs. Terms defined in a generally used dictionary are to be interpreted to have meanings equal to the contextual meanings in a relevant technical field, and are not interpreted to have ideal or excessively formal meanings unless clearly defined in the specification.

Figure 1:
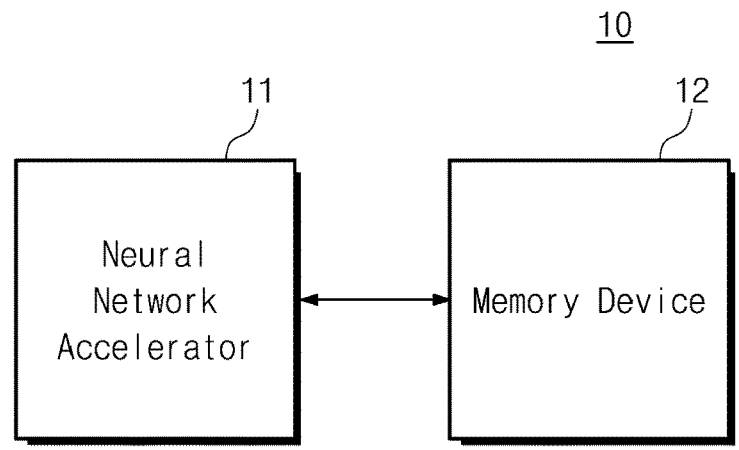
FIG. 1 is a block diagram illustrating a DNN system according to an embodiment of the present disclosure.
Figure 2:
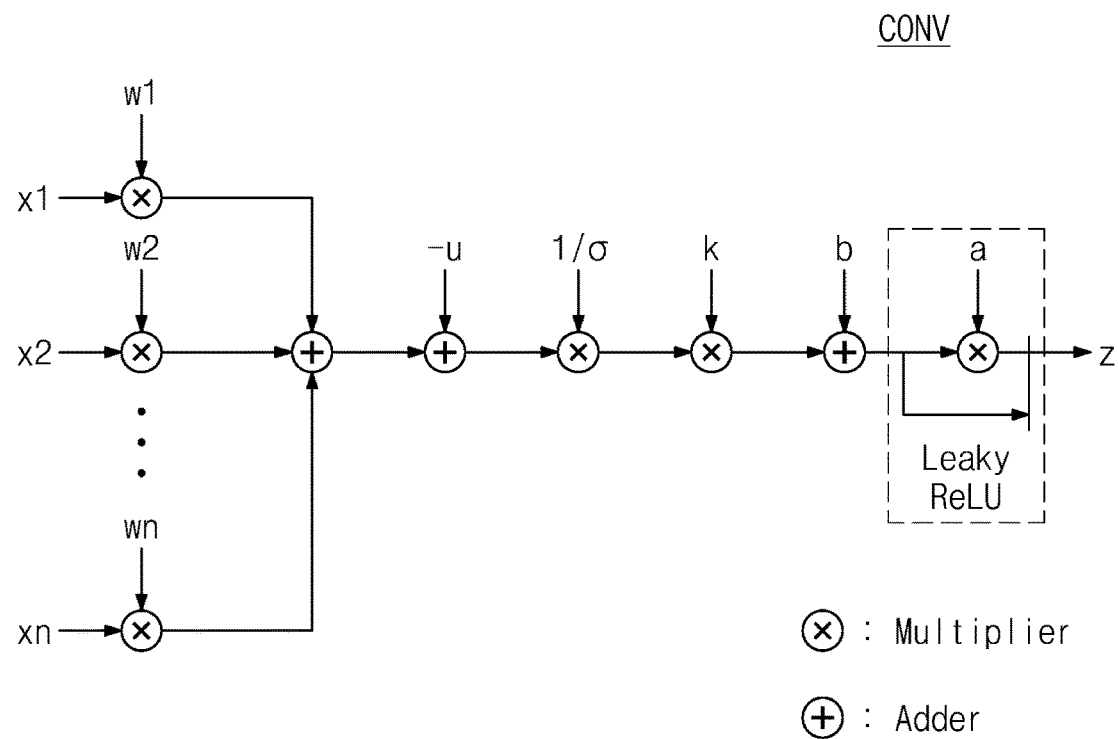
FIG. 2 is a diagram illustrating a convolutional layer performed by the DNN system of FIG. 1.

FIG. 1 is a block diagram illustrating a DNN system according to an embodiment of the present disclosure. FIG. 2 is a diagram illustrating a convolutional layer performed by the DNN system of FIG. 1. Referring to FIGS. 1 and 2, a DNN system 10 may include a neural network accelerator 11 and a memory device 12. In an embodiment, the DNN system 10 may be configured to drive various DNNs such as YOLO, ResNet, ResNeXt, DenseNet, and graph convolutional network (GCN). In an embodiment, the DNN system 10 may include various computing systems or information processing systems such as a personal computer, a notebook computer, a tablet PC, a smartphone, a server, a workstation, a black box, an automotive electronic system, and the like.

The neural network accelerator 11 may perform DNN learning based on input information received from the outside. For example, the neural network accelerator 11 may perform DNN learning based on the input information received from the outside and weight information from the memory device 12. The memory device 12 may be configured to store the weight information used for DNN learning or may be configured to store the result of DNN learning performed by the neural network accelerator 11.

In an embodiment, the DNN learning of the neural network accelerator 11 may be performed based on a convolution neural network (CNN), but the scope of the present disclosure is not limited thereto. In general, the CNN may be performed by repeatedly performing multiplication and addition on input data and a weight. For example, as illustrated in FIG. 2, the neural network accelerator 11 may be configured to learn the input data based on a convolution layer CONV.

In more detail, the convolution layer CONV may output output data 'z' by repeatedly performing multiplication and addition on the input data x1 to xn, weights w1 to wn, and parameters −u, 1/σ, k, b, a, or the like. The neural network accelerator 11 may include a multiplier and an adder that are used to perform the convolution layer CONV. In general, the multiplier has a relatively large amount of computation and hardware as compared to the adder. That is, upon processing the convolutional layer CONV, the computational amount and hardware complexity may be increased due to the multiplier.

In an embodiment, a multiplication operation on a real domain may be converted into a logarithmic addition operation by converting input data on a real domain into data on the logarithm domain. In this case, the amount of computation for the convolution layer CONV may be reduced. In addition, the addition operation on the real domain may be converted into a Jacobian logarithmic addition operation by converting the input data on the real domain into data on the logarithm domain.

In an embodiment, embodiments of the present disclosure may convert multiplication and addition on a real domain into logarithmic addition and Jacobian logarithmic addition, thereby reducing the amount of computation and hardware configuration of the DNN. In an embodiment, embodiments of the present disclosure may provide a structure of a Jacobian logarithmic adder configured to implement Jacobian logarithmic addition. The structure of a Jacobian logarithmic adder of the DNN accelerator according to an embodiment of the present disclosure will be described in more detail with reference to the following drawings.

Figure 3A:
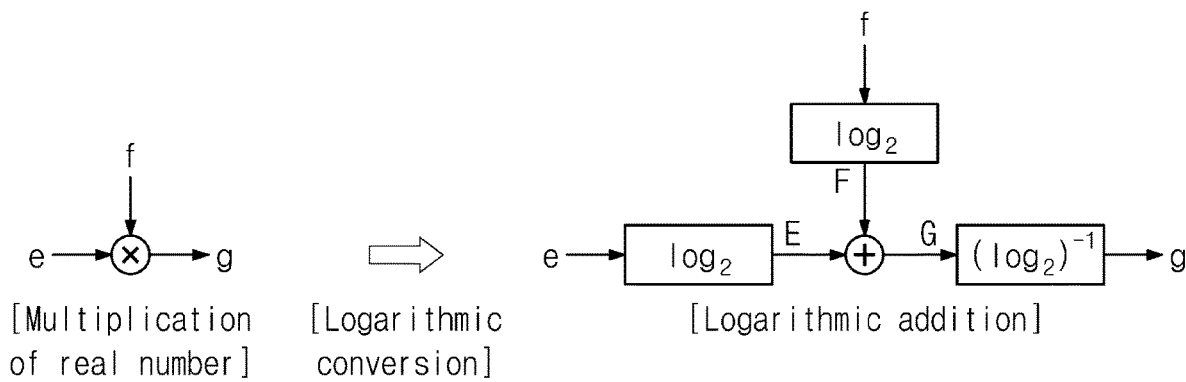
FIGS. 3A and 3B are diagrams illustrating a configuration converting an operation on a real domain into an operation on a logarithm domain.
Figure 3B:
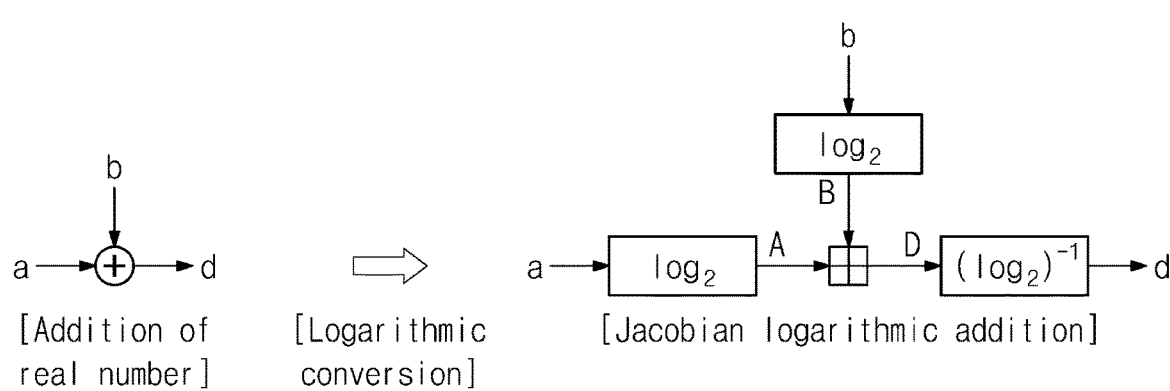

FIGS. 3A and 3B are diagrams illustrating a configuration converting an operation on a real domain into an operation on a logarithm domain. Hereinafter, various reference symbols are used. At this time, for convenience of description, a value on a real domain is marked in a lowercase letter, and a value on a logarithm domain is marked in an uppercase letter. That is, a value of 'a' may indicate a value on the real domain, and the value of 'A' may indicate a value (i.e., $\log_2 a$) obtained by applying a logarithm (or a binary logarithm of base 2, $\log_2$) to 'a'. However, the scope of the present disclosure is not limited thereto, and each reference symbol may have various meanings according to embodiments presented in the detailed description and the drawings. Besides, the base of a logarithm applied to a real value may be variously modified.

First of all, referring to FIG. 3A, a configuration in which multiplication on a real domain is converted to addition on a logarithm domain will be described. For example, the multiplication on a real domain may be identical to that as shown in FIG. 3A. When input data is converted into data on the logarithm domain (i.e., applying a binary logarithm $\log_2$ to the input data), the multiplication on the real domain may be converted to the addition on the logarithm domain as shown in FIG. 3A. In an embodiment, data on the real domain may be converted into data on the logarithm domain by a separate log converter $\log_2$.

The above-described multiplication on the real domain and the above-described addition on the logarithm domain may be expressed as Equation 1.

$$g = e \times f$$

$$G = E + F \quad \text{[Equation 1]}$$

Referring to Equation 1, 'g' may be output data (i.e., a multiplication result). Each of 'e' and 'f' may be input data. 'G', 'E', and 'F' may denote $\log_2 g$, $\log_2 e$, and $\log_2 f$, respectively. That is, as shown in FIG. 3A, multiplication on the real domain may be converted to addition on the logarithm domain by applying a binary logarithm to the input data. In this case, the amount of computation may be reduced. In an embodiment, division may be converted to subtraction on the logarithm domain, which is similar to the above-described conversion to the addition of the logarithm domain, and thus a detailed description thereof is omitted to avoid redundancy.

Next, referring to FIG. 3B, a configuration in which the addition on the real domain is converted into Jacobian logarithmic addition will be described. For example, the addition on the real domain will be described with reference to FIG. 3B. When the input data is converted into data on the logarithm domain (i.e., applying a binary logarithm $\log_2$ to the input data), the addition on the real domain may be converted into the Jacobian logarithmic addition as shown in FIG. 3B.

The above-described addition on the real domain and the above-described Jacobian logarithmic addition may be expressed as Equation 2.

$$d = a + b$$

$$D = A \boxplus B \quad \text{[Equation 2]}$$

Referring to Equation 2, 'd' may be output data (i.e., an addition result). Each of 'a' and 'b' may be input data. 'D', 'A', and 'B' may indicate $\log_2 d$, $\log_2 a$, and $\log_2 b$, respectively. $\boxplus$ may indicate an operator of Jacobian logarithmic addition. That is, as shown in FIG. 3B, the addition on the real domain may be converted into the Jacobian logarithmic addition by applying the binary logarithm to the input data. In an embodiment, the Jacobian logarithmic addition may be performed by a Jacobian logarithmic adder 100 described below.

The Jacobian logarithmic addition may be expressed as a maximum value term and an offset term as shown in Equation 3.

$$D = \text{MAX}(A,B) + \log_2(1 + 2^{-|A-B|}) \quad \text{[Equation 3]}$$

Referring to Equation 3, MAX(A, B) denotes an operator that determines a maximum value among 'A' and 'B'. The remaining factors are described above, and thus the detailed description thereof will be omitted to avoid redundancy. As described above, the amount of computation of DNN may be reduced by converting operations on the real domain used in the DNN (e.g., a convolution layer) into operations on the logarithm domain.

In an embodiment, when a value corresponding to the input data is negative, an operation on a logarithm domain based on Equation 1 or Equation 3 may not be established because a binary logarithm is not applied to a negative number. According to an embodiment of the present disclosure, the operation on the logarithm domain may be performed while the input data is divided into a magnitude component and a sign component.

In this case, addition on the logarithm domain (i.e., multiplication on the real domain) may be expressed as Equation 4.

$$E_M = \log_2 |e|$$

$$F_M = \log_2 |f|$$

$$G_s = \text{XOR}(E_s, F_s)$$

$$G_M = E_M + F_M \quad \text{[Equation 4]}$$

Referring to Equation 4, $E_M$ and $F_M$ may denote magnitude components of input data 'e' and 'f', respectively. $E_S$, and $F_S$ may denote sign components of the input data 'e' and 'f', respectively. $G_S$ may denote a sign component of the result of logarithmic addition. $G_M$ may denote a magnitude component of logarithmic addition. The remaining factors are described above, and thus the detailed descriptions thereof will be omitted to avoid redundancy.

In an embodiment, the Jacobian logarithmic addition (i.e., addition on the real domain) may be expressed as Equation 5.

$$A_M = \log_2|a|$$

$$B_M = \log_2|b|$$

$$D_S = \text{sign}(\text{MAX}(A_M, B_M))$$

$$D_M = \text{MAX}(A_M, B_M) + \log_2(1 \pm 2^{-|A_M - B_M|}) \quad \text{[Equation 5]}$$

Referring to Equation 4, sign(MAX($A_M$, $B_M$)) denotes an operator that determines a sign corresponding to the larger value among '$A_M$' and '$B_M$'. The remaining factors are described above, and thus the detailed description thereof will be omitted to avoid redundancy.

As mentioned above, an operation of a negative number may be normally converted to an operation on the logarithm domain by performing an operation on a logarithm domain while the magnitude component and the sign component of the input data are separated from each other.

That is, multiplication on the real domain may be converted to addition on the logarithm domain. In this case, in the case of the sign component $G_S$, when signs of the input data on the real domain are the same as each other, a sign of the output data is "+". When signs of the input data on the real domain are different from each other, a sign of the output data is "−". A magnitude component $G_M$ is the sum of magnitude components of the input data. In an embodiment, when division on the real domain is converted to an operation on a logarithm domain, the division on the real domain is the same as multiplication on the real domain except that a magnitude component is represented as a difference between magnitude components of the input data, and thus a detailed description thereof is omitted to avoid redundancy.

In addition, addition on the real domain may be converted to Jacobian logarithmic addition. In this case, the sign component $D_S$ may be determined as a sign corresponding to a larger value among magnitude components of the input data. The magnitude component $D_M$ may be determined as the sum of an offset and the larger value among the magnitude components of the input data. In an embodiment, subtraction on the real domain may be implemented in the same structure as addition on the real domain by inverting a sign of one among pieces of input data, and thus a detailed description thereof will be omitted to avoid redundancy.

In an embodiment, as expressed in Equation 5, the magnitude $D_M$ of Jacobian logarithmic addition may be divided into a maximum value term and an offset term. In this case, the maximum value may be relatively accurately calculated by comparing magnitude components of the input data. On the other hand, the offset term may include an exponential term and a log term. In this case, an operation of the offset term may be simplified by using quantization and saturation for the offset term.

In an embodiment, as described above, an operation of converting input data on a real domain into data on a logarithm domain may be performed by a log converter. An operation of converting an operation on the real domain into an operation on the logarithm domain and an arithmetic operation (e.g., logarithmic addition, logarithmic subtraction, Jacobian logarithmic addition, or the like) on the logarithm domain may be performed by an operation circuit included in the neural network accelerator 11. That is, the operation circuit of the neural network accelerator 11 may include a structure of a Jacobian logarithmic adder described below.

Hereinafter, a hardware structure of the Jacobian logarithmic adder of a neural network accelerator according to an embodiment of the present disclosure will be described. For convenience of description, a configuration of the Jacobian logarithmic adder for addition on the real domain is mainly described, but the scope of the present disclosure is not limited thereto. For example, it will be understood that the conversion of various operations such as subtraction, multiplication, division, and the like on the real domain may be easily implemented based on a structure of a Jacobian logarithmic adder described below.

Figure 4:
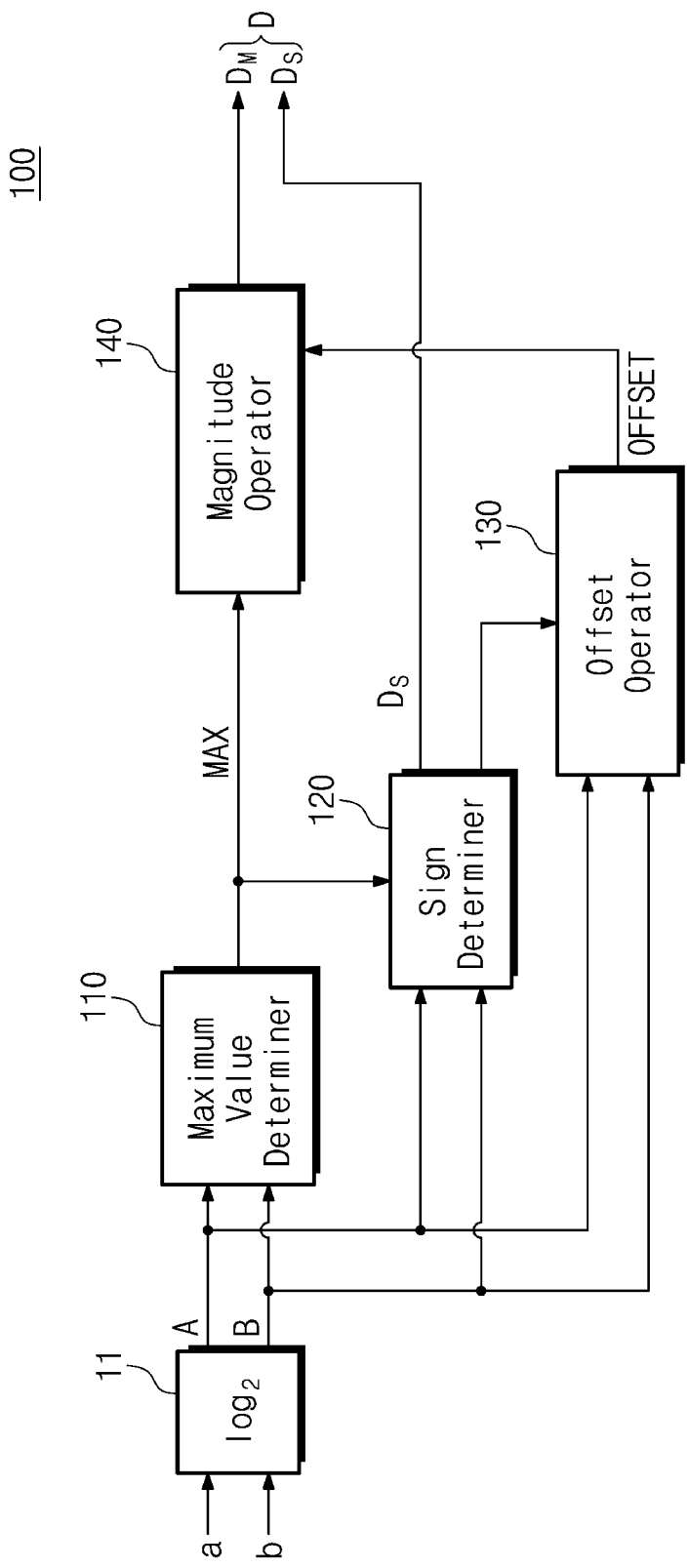
FIG. 4 is a block diagram illustrating a Jacobian logarithmic adder.

FIG. 4 is a block diagram illustrating a Jacobian logarithmic adder. In an embodiment, the Jacobian logarithmic adder 100 may be included in the neural network accelerator 11 and may be used in a training process of the neural network accelerator 11.

Referring to FIG. 4, input data A and B input to the Jacobian logarithmic adder 100 may be values on a logarithm domain. For example, each of the input data A and B may be a value obtained by applying a binary log 11 ($\log_2$) to each of real number data (a, b). In an embodiment, each of the input data A and B may include a magnitude component and a sign component described with reference to Equation 4 and Equation 5. That is, similarly as described with reference to Equation 4 and Equation 5, the first input data 'A' may include a first magnitude component $A_M$ and a first sign component $A_S$ of a real number value (a). The second input data 'B' may include a second magnitude component $B_M$ and a second sign component $B_S$ of a real number value (b).

The Jacobian logarithmic adder 100 may include a maximum value determiner 110, a sign determiner 120, an offset operator 130, and a magnitude operator 140.

The maximum value determiner 110 may be configured to determine a maximum value MAX for the input data A and B. For example, the maximum value determiner 110 may compare the first magnitude component $A_M$ of the first input data 'A' and the second magnitude component $B_M$ of the second input data 'B' and may output the larger value as the maximum value MAX.

The sign determiner 120 may determine a sign component $D_S$ corresponding to the maximum value MAX. For example, when the maximum value MAX is the first magnitude component $A_M$, the sign component $D_S$ may be determined as the first sign component $A_S$. When the maximum value MAX is the second magnitude component $B_M$, the sign component $D_S$ may be determined as the second sign component $B_S$.

The offset operator 130 may be configured to calculate an offset OFFSET based on the first and second input data A and B and the sign component $D_S$. For example, the offset operator 130 may be configured to calculate an offset term in Equation 5, that is, $\log_2(1+2^{-|A_M - B_M|})$ and $\log_2(1-2^{-|A_M - B_M|})$, based on magnitude components of the first and second input data A and B. The offset operator 130 may be configured to output one of values of the calculated offset terms as the offset OFFSET based on the sign components $A_S$ and $B_S$ of the first and second input data A and B. In an embodiment, the offset operator 130 may be configured to calculate the offset OFFSET by using saturation and quantization.

The magnitude operator 140 may calculate a magnitude component $D_M$ of output data 'D' based on the maximum value MAX determined from the maximum value determiner 110 and the offset OFFSET calculated from the offset operator 130. For example, as described with reference to Equation 5, the magnitude component $D_M$ of the output data 'D' may be expressed as the sum of the maximum value MAX and the offset OFFSET. That is, the magnitude operator 140 may output the sum of the maximum value MAX and the offset OFFSET as the magnitude component $D_M$.

In an embodiment, the output data 'D' including the magnitude component $D_M$ and the sign component $D_S$ may be provided as an input to the next operation or next layer.

Figure 5:
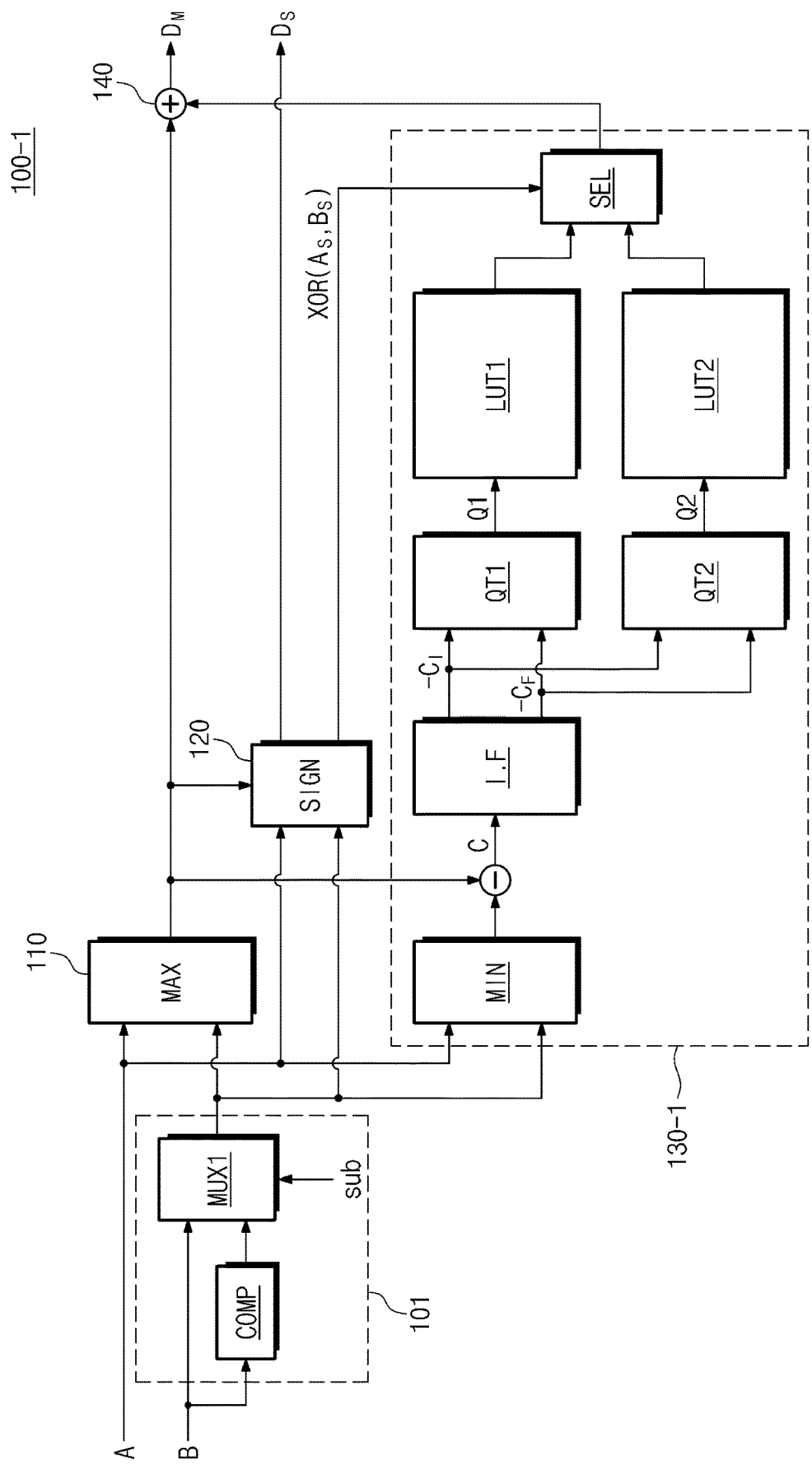
FIG. 5 is a block diagram illustrating the Jacobian logarithmic adder of FIG. 4 in more detail.

FIG. 5 is a block diagram illustrating the Jacobian logarithmic adder of FIG. 4 in more detail. For brevity of illustration and for convenience of description, additional description associated with the components described above will be omitted to avoid redundancy.

Referring to FIGS. 4 and 5, a Jacobian logarithmic adder 100-1 may include an input data handler 101, the maximum value determiner 110, the sign determiner 120, an offset operator 130-1, and the magnitude operator 140. The input data handler 101 may include a complement unit COMP and a first multiplexer MUX1. The complement unit COMP may generate a complement of one (e.g., B) of input data A and B. The first multiplexer MUX1 may select and output one of the input data 'B' and the generated complement in response to a subtraction signal sub.

As described above, subtraction on a real domain may be performed in the same manner as addition on the real domain by inverting a sign of one of the input data (i.e., generating the complement of one of the input data). That is, when the subtraction between the input data A and B is performed, the subtraction may be performed by providing the Jacobian logarithmic adder 100-1 with the first input data 'A' and the complement of the second input data 'B'. Hereinafter, for convenience of description, an embodiment of the present disclosure will be described based on addition on a real domain or Jacobian logarithmic addition. That is, it is assumed that a value output from the first multiplexer MUX1 is the second input data 'B'. However, the scope of the present disclosure is not limited thereto. When the subtraction is performed, the first multiplexer MUX1 may output the complement of the second input data 'B' in response to the subtraction signal sub.

The maximum value determiner 110 may compare magnitude components of the first and second input data A and B, and may output a larger value as the maximum value MAX.

The sign determiner 120 may output a sign component of input data corresponding to the maximum value MAX among the first and second input data A and B, as the sign component $D_S$ of the output data 'D'.

The offset operator 130-1 may include a minimum value determination unit MIN, an integer separation unit I.F, a first quantization unit QT1, a second quantization unit QT2, a first lookup table LUT1, a second lookup table LUT2, and an offset selector SEL.

The minimum value determination unit MIN may be configured to compare magnitude components of the first and second input data A and B, and to output the smallest value as a minimum value depending on the comparison result.

The difference between the minimum value determined by the minimum value determination unit MIN and the maximum value determined by the maximum value determiner 110 may be described with reference to Equation 6.

$$\text{MIN} - \text{MAX} = -|A_M - B_M| = C \qquad \text{[Equation 6]}$$

Referring to Equation 6, MIN may denote a smaller value (i.e., a minimum value) among magnitude components of the first and second input data A and B. MAX may denote a larger value (i.e., a maximum value) of magnitude components of the first and second input data A and B. That is, 'C' may denote an exponential component of an exponential term of the offset term in Equation 5, that is, $-|A_M - B_M|$.

The operation result C may be provided to the integer separation unit I.F. The integer separation unit I.F may output the operation result C as an integer component $—C_I$ and a decimal component $—C_F$. The first quantization unit QT1 may saturate and quantize an output (i.e., $—C_I$ or $—C_F$) of the integer separation unit I.F, and may output a quantized result $Q_1$. The second quantization unit QT2 may saturate and quantize an output (i.e., $—C_I$ or $—C_F$) of the integer separation unit I.F, and may output a quantized result $Q_2$. In an embodiment, the quantized results $Q_1$ and $Q_2$ may have the same value as each other.

The first lookup table LUT1 may be configured to output a first offset value based on the first quantization result Q1. The second lookup table LUT2 may be configured to output a second offset value based on the second quantization result $Q_2$.

For example, the first lookup table LUT1 may include information between values of $\log_2(1+2^{Q_1})$ for the first quantization result $Q_1$. That is, the first lookup table LUT1 may be configured to output a value of $\log_2(1+2^{Q_1})$ corresponding to the first quantization result $Q_1$.

The second lookup table LUT2 may include information between values of $\log_2(1-2^{Q_1})$ for the second quantization result Q2. That is, the second lookup table LUT2 may be configured to output a value of $\log_2(1-2^{Q_1})$ corresponding to the second quantization result $Q_2$.

At this time, as described above, the first and second quantization results $Q_1$ and $Q_2$ are the results of saturating and quantizing $-|A_M - B_M|$. That is, one of values output through the first and second lookup tables LUT1 and LUT2 may be the offset OFFSET of the magnitude component $D_M$ of the output data 'D'.

The offset selector SEL is configured to select one of the values output through the first and second lookup tables LUT1 and LUT2 based on the sign components $A_S$ and $B_S$ of the first and second input data A and B. For example, when the sign components $A_S$ and $B_S$ of the first and second input data A and B are the same as each other, the offset selector SEL may select an output (i.e., $\log_2(1+2^{Q_1})$) of the first lookup table LUT1. When the sign components $A_S$ and Bs of the first and second input data A and B are different from each other, the offset selector SEL may select an output (i.e., $\log_2(1-2^{Q_1})$) of the second lookup table LUT2. That is, the offset selector SEL may be configured to select one of values output through the first and second lookup tables LUT1 and LUT2 in response to the value or signal of $XOR(A_S, B_S)$. In an embodiment, the comparison between the sign components $A_S$ and $B_S$ of the first and second input data A and B may be performed by the sign determiner 120, or a comparison signal (i.e., $XOR(A_S, B_S)$) may be generated by the sign determiner 120.

An output of the offset selector SEL (i.e., the offset OFFSET) may be provided to the magnitude operator 140. The magnitude operator 140 may output the sum of an output of the offset selector SEL (i.e., the offset OFFSET) and the maximum value MAX determined by the maximum value determiner 110, as the magnitude component $D_M$ of the output data 'D'.

As described above, the Jacobian logarithmic adder 100 or 100-1 according to an embodiment of the present disclosure may perform an operation while a magnitude component and a sign component are separated from each other, and may perform approximation through saturation and quantization on an offset term included in the magnitude component, thereby reducing the amount of computation. Accordingly, an operation of the DNN may be performed without a multiplier by converting operations (addition, subtraction, multiplication, division, and the like) on a real domain used in the DNN to an operation on a logarithm domain. Accordingly, a neural network accelerator with improved performance is provided.

Figure 6:
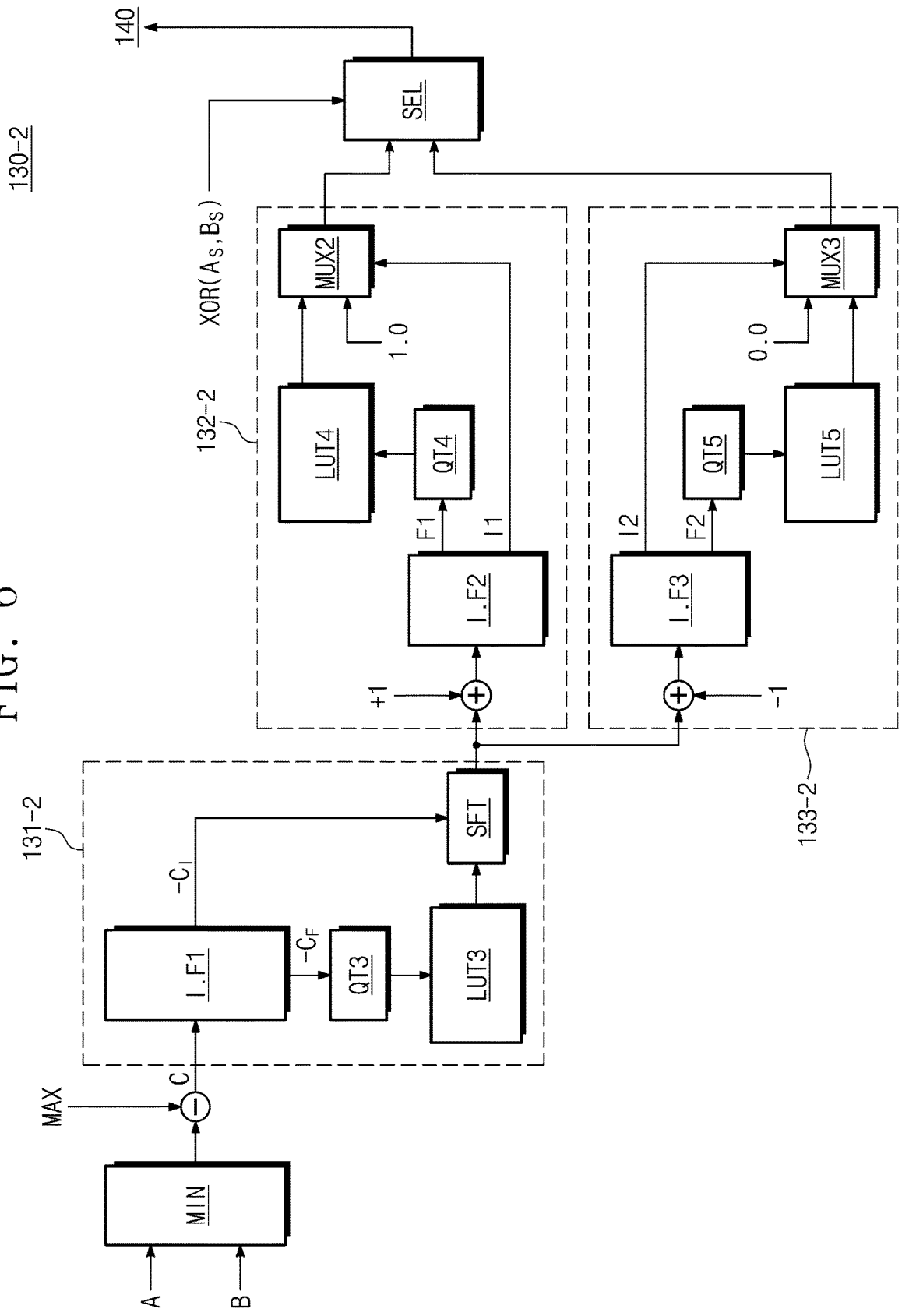
FIG. 6 is a block diagram illustrating a structure of the offset operator of FIG. 4.

FIG. 6 is a block diagram illustrating a structure of the offset operator of FIG. 4. In an embodiment, for convenience of description, components unnecessary to describe an offset operator 130-2 of FIG. 6 may be omitted to avoid redundancy. The offset operator 130-2 of FIG. 6 may be replaced with the offset operator 130 of FIG. 4 or the offset operator 130-1 of FIG. 5. That is, the offset operator 130-2 of FIG. 6 may constitute a Jacobian logarithmic adder together with the input data handler 101, the maximum value determiner 110, the sign determiner 120, and the magnitude operator 140 that are described with reference to FIGS. 4 and 5.

Referring to FIGS. 4 to 6, the offset operator 130-2 may include the minimum value determiner MIN, a first operating unit 131-2, a second operating unit 132-2, and a third operating unit 133-2, and the offset selector SEL.

The minimum value determiner MIN may determine a minimum value of the first and second input data A and B. The difference between the determined minimum value and a maximum value may be calculated as 'C', as described with reference to Equation 6. The first operating unit 131-2 may calculate a value of $2^{-|A_M-B_M|}$ described with reference to Equation 5 based on the value of 'C'. For example, the first operating unit 131-2 may include a first integer separation unit I.F1, a third quantization unit QT3, a third lookup table LUT3, and a bit shifter SFT.

The first integer separation unit I.F1 may divide the input value 'C' (i.e., $-|A_M-B_M|$) into an integer $—C_I$ and a decimal $—C_F$. The third quantization unit QT3 may quantize the decimal $—C_F$. The third lookup table LUT3 may be configured to output a value corresponding to the result quantized by the third quantization unit QT3. At this time, a value output by the third lookup table LUT3 may be a value of $2^{-C_F}$. That is, the third lookup table LUT3 may include information about the value of $2^{-C_F}$ corresponding to the result quantized by the third quantization unit QT3, and may output the corresponding value of $2^{-C_F}$ depending on the result quantized by the third quantization unit QT3.

The bit shifter SFT may shift a bit value of an output of the third lookup table LUT3 based on the value of integer $—C_1$. For example, in the case of the input value C (i.e., $-|A_M-B_M|$), the relationship between a value of $2^{-|A_M-B_M|}$, the integer $—C_1$, and the decimal $—C_F$ may be expressed as Equation 7.

$$2^{-|A_M-B_M|}=2^{-C}=2^{-C_1-C_F}=2^{-C_1}\times 2^{-C_F} \qquad \text{[Equation 7]}$$

Factors of Equation 7 are described above, and thus, detailed descriptions thereof will be omitted to avoid redundancy. That is, as shown in Equation 7, the value of $2^{-|A_M-B_M|}$ may be expressed as a product of a value of $2^{-C_1}$ and a value of $2^{-C_F}$. At this time, the product of the value of $2^{-C_1}$ and the value of $2^{-C_F}$ is an exponent of 2, and thus is identical to performing bit-shifting on the value of $2^{-C_F}$ by the number of bits of $C_I$. As a result, the value of $2^{-|A_M-B_M|}$ may be generated by performing bit-shifting the output value (i.e., $2^{-C_F}$) of the third lookup table LUT3 by the number of bits of $C_I$. As described above, the first operating unit 131-2 may generate a value of $2^{-|A_M-B_M|}$ through an approximation operation. Hereinafter, for convenience of description, the value of $2^{-|A_M-B_M|}$ is referred to as "X" or an intermediate value.

The second operating unit 132-2 may generate a first offset value (i.e., $\log_2(1+X/16)$) based on the output X of the first operating unit 131-2. The third operating unit 133-2 may generate a second offset value $\log_2(1-X/16)$ based on the output X of the first operating unit 131-2.

For example, the second operating unit 132-2 may include a second integer separation unit I.F2, a fourth quantization unit QT4, a fourth lookup table LUT4, and a second multiplexer MUX2. The second integer separation unit I.F2 may separate an input value (i.e., '1+X'), which is obtained by adding "1" to an output X of the first operating unit 131-2, into a first integer I1 and a first decimal F1. The fourth quantization unit QT4 may quantize the first decimal F1. The fourth lookup table LUT4 may output an output value based on the result quantized by the fourth quantization unit QT4. In an embodiment, the output value output by the fourth lookup table LUT4 may be a value corresponding to $\log_2(1+X)$. That is, the fourth lookup table may include information between values of $\log_2(1+X)$ corresponding to the result quantized by the fourth quantization unit QT4.

The second multiplexer MUX2 may be configured to output a first offset in response to the first integer I1 of the second integer separation unit I.F2. For example, when a value of the first integer I1 is "0", the second multiplexer MUX2 may output a value of $\log_2(1+X)$ output by the fourth lookup table LUT4 as a first offset. When the value of the first integer I1 is "1", the second multiplexer MUX2 may output a value of "1" as the first offset.

The third operating unit 133-2 may include a third integer separation unit I.F3, a fifth quantization unit QT5, a fifth lookup table LUT5, and a third multiplexer MUX3. The third integer separation unit I.F3 may separate an input value (i.e., '-1+X'), which is obtained by subtracting "1" from the output X of the first operating unit 131-2, into a second integer I2 and a second decimal F2. The fifth quantization unit QT5 may quantize the second decimal F2. The fifth lookup table LUT5 may output an output value based on the result quantized by the fifth quantization unit QT5. In an embodiment, the output value output by the fifth lookup table LUT5 may be a value corresponding to $\log_2(1-X)$. That is, the fifth lookup table may include information between values of $\log_2(1-X)$ corresponding to the result quantized by the fifth quantization unit QT5.

The third multiplexer MUX3 may be configured to output the second offset in response to the second integer I2 of the third integer separation unit I.F3. For example, when the value of second integer I2 is "0", the third multiplexer MUX3 may output the value of "0" as a second offset. When the value of second integer I2 is "1", the third multiplexer MUX3 may output the value of $\log_2(1-X)$ output by the fifth lookup table LUT5 as the second offset.

The offset selector SEL may output one of the first and second offsets as an offset value in response to the XOR($A_S$, $B_S$) (i.e., a comparison signal) from the sign determiner 120. An operation of the offset selector SEL is described above, and thus, an additional description thereof will be omitted to avoid redundancy.

As described above, the Jacobian logarithmic adder according to an embodiment of the present disclosure may calculate the magnitude component $D_M$ and the sign component $D_S$ of the output data 'D' while the magnitude component $D_M$ and the sign component $D_S$ of the output data 'D' are separated from each other. At this time, the magnitude component $D_M$ may be divided into a maximum value term and an offset term. The amount of computation may be reduced by approximating an operation for the offset term through saturation and quantization. In an embodiment, the operation for the offset term may be performed by dividing the first offset and the second offset depending on a sign of the input data. Alternatively, the operation for the offset term may be performed by dividing the first offset and the second offset according to the sign of the input data after approximating the exponential term of the offset term. In this case, calculation accuracy may be improved. Accordingly, a Jacobian logarithmic adder with improved performance and reduced cost and a neural network accelerator including the same may be provided.

Figure 7:
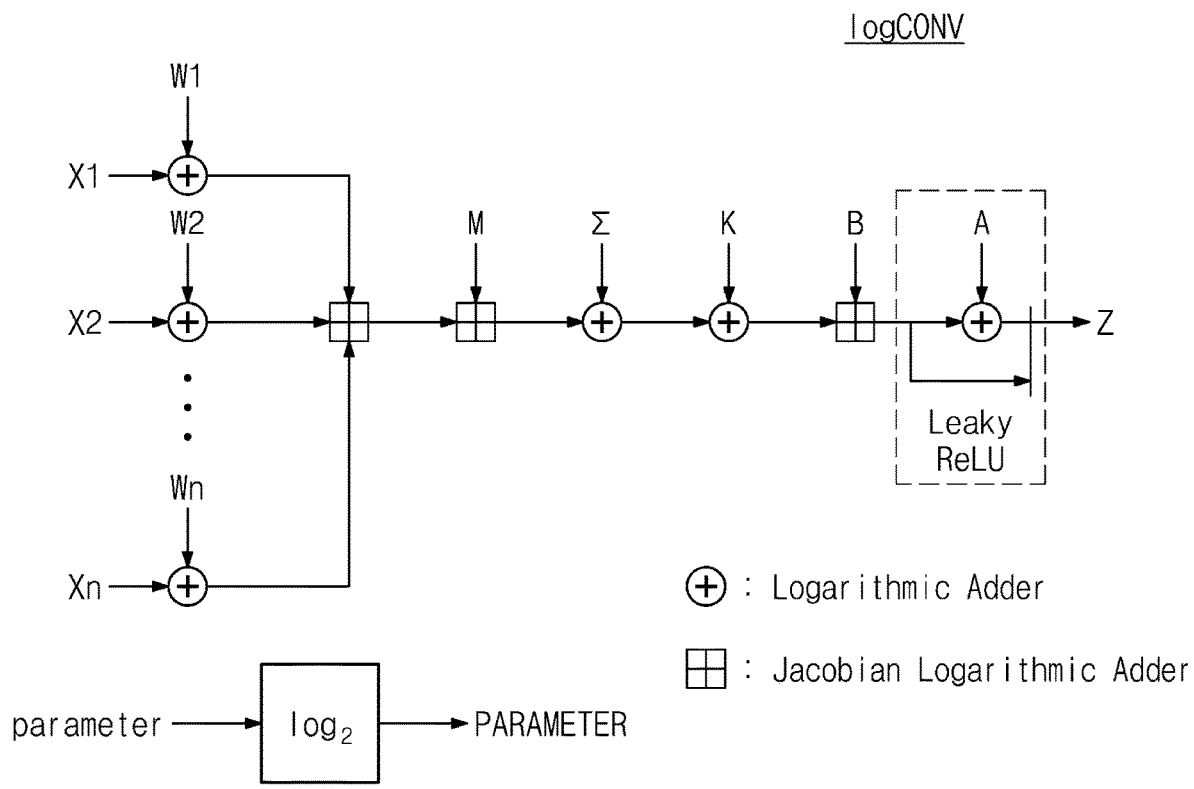
FIG. 7 is a diagram illustrating an operation process of CNN, to which a Jacobian logarithmic adder is applied, according to an embodiment of the present disclosure.

FIG. 7 is a diagram illustrating an operation process of CNN, to which a Jacobian logarithmic adder is applied, according to an embodiment of the present disclosure. For brevity of illustration and for convenience of description, additional description associated with the components described above will be omitted to avoid redundancy. CNN logCONV of a logarithm domain of FIG. 7 shows a layer in which CNN CONV on a real domain of FIG. 2 is converted to an operation on the logarithm domain. That is, the conversion to parameters PARAMETER (e.g., X1 to Xn, W1 to Wn, M, Y, K, B, A, and the like) on the logarithm domain may be made by applying a binary log $\log_2$ to input parameters (e.g., x1 to xn, w1 to wn, −u, 1/σ, k, b, a, and the like) of FIG. 2. The CNN logCONV on the logarithm domain may be performed based on the converted parameters PARAMETER on the logarithm domain.

As an embodiment in FIG. 2 is compared to an embodiment in FIG. 7, multiplications (i.e., multiplications on a real domain) of FIG. 2 may be converted to additions (i.e., additions on a logarithm domain) of FIG. 7, and may be performed by using an adder on the logarithm domain. In addition, additions of FIG. 2 (i.e., additions on the real domain) may be converted into a Jacobian logarithmic addition of FIG. 7, and may be performed by using the Jacobian logarithmic adder described above. That is, an operation of the CNN may be performed without a multiplication operation requiring a relatively large amount of computation by converting operations on the real domain into operations (in particular, a Jacobian logarithmic addition according to an embodiment of the present disclosure) on the logarithm domain.

Figure 8:
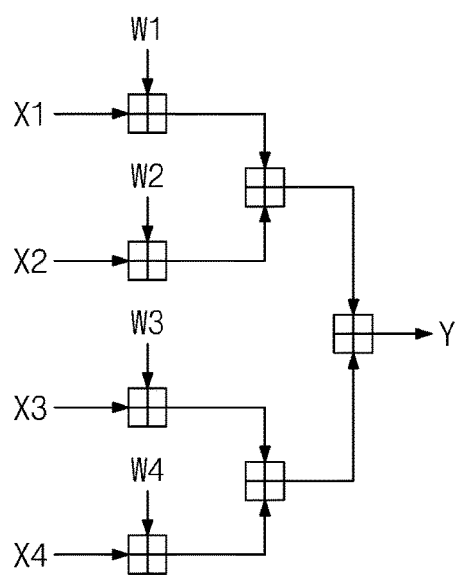
FIG. 8 is a diagram illustrating a parallel operation structure of a Jacobian logarithmic adder according to an embodiment of the present disclosure.

FIG. 8 is a diagram illustrating a parallel operation structure of a Jacobian logarithmic adder according to an embodiment of the present disclosure. As shown in FIG. 8, the Jacobian logarithmic adder according to an embodiment of the present disclosure may have a parallel connection structure. For example, each of pieces of input data X1 to X4 and each of weights W1 to W4 may be calculated through the Jacobian logarithmic adder according to an embodiment of the present disclosure. Each of the results may have a magnitude component and a sign component. Accordingly, operations of each of results may be performed again through the Jacobian logarithmic adder according to an embodiment of the present disclosure. A parallel operation for four inputs is described in FIG. 8, but the scope of the present disclosure is not limited thereto.

Figure 9A:
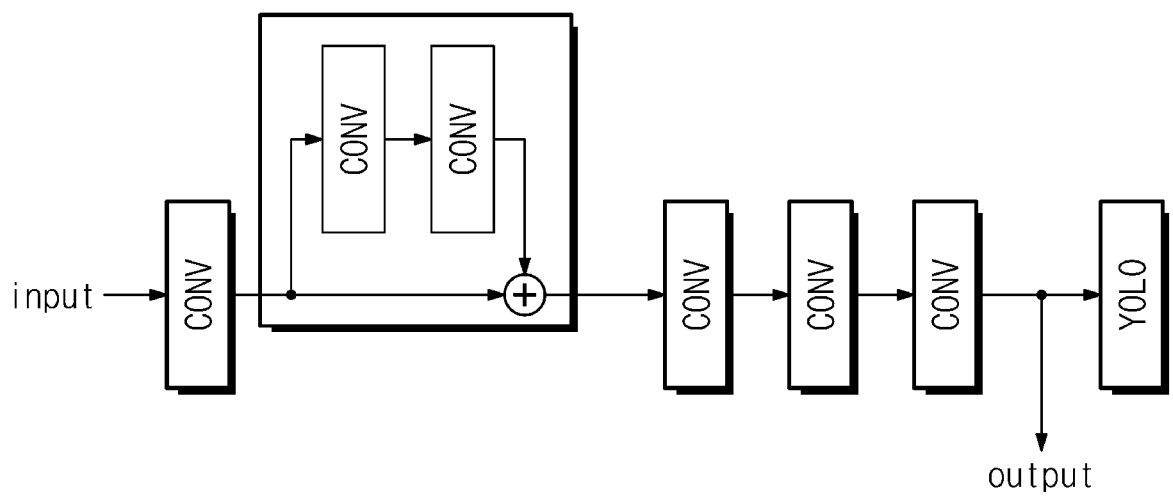
FIGS. 9A and 9B are diagrams illustrating a YOLO neural network, to which a Jacobian logarithmic adder is applied, according to an embodiment of the present disclosure.
Figure 9B:
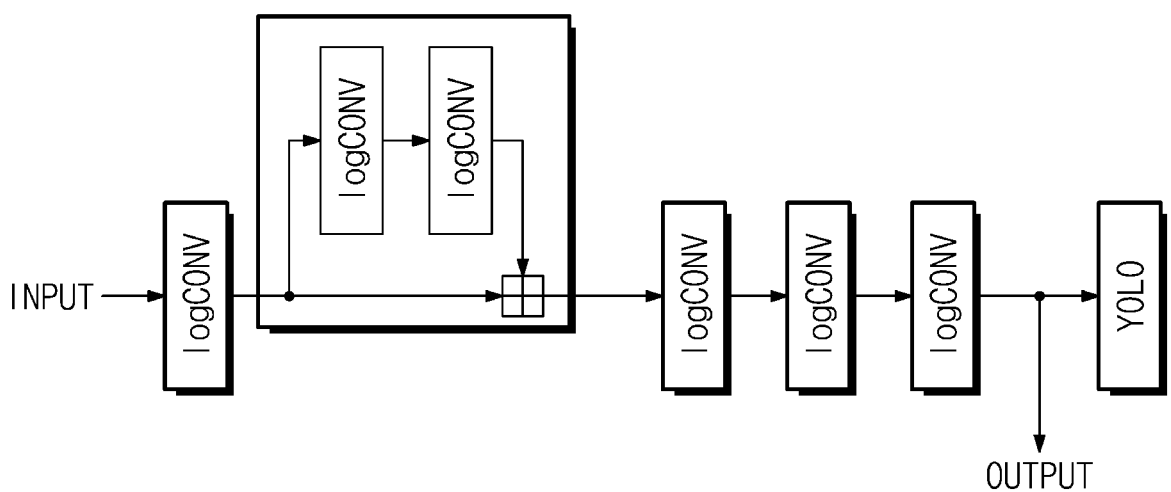

FIGS. 9A and 9B are diagrams illustrating a YOLO neural network, to which a Jacobian logarithmic adder is applied, according to an embodiment of the present disclosure. FIG. 9A is a diagram illustrating some layers of a conventional YOLO neural network YOLOv3. FIG. 9B is a diagram illustrating some layers of a YOLO neural network logYOLOv3 on a logarithm domain, to which a Jacobian logarithmic adder is applied, according to an embodiment of the present disclosure. In FIGS. 9A and 9B, some layers of a neural network are illustrated for brevity of illustration, but the scope of the present disclosure is not limited thereto.

Referring to FIG. 9A, the YOLO neural network YOLOv3 may include a plurality of convolution layers CONV and a YOLO layer YOLO. Each of the plurality of convolution layers CONV may be configured to perform a convolution operation on input data (input). The sum of the results of some convolution layers (CONV) may be provided as an input to the next convolution layer. The input of the YOLO layer YOLO may be output as output data (output).

Next, referring to FIG. 9B, the YOLO neural network logYOLOv3 on a logarithm domain may include a plurality of convolution layers logCONV and a YOLO layer YOLO. Each of a plurality of convolution layers logCONV may be configured to perform a convolution operation on input data (INPUT). In this case, the convolution layers logCONV may perform an operation based on a logarithm domain. That is, the convolution layers logCONV may perform a convolution operation based on addition on the logarithm domain and Jacobian logarithmic addition that are described with reference to FIGS. 1 to 8.

The sum of results of some convolution layers logCONV may be provided as an input to the next convolution layer. In this case, the sum operation may be converted and performed an operation on a logarithm domain. That is, the sum of the results of some convolution layers logCONV may be performed through a Jacobian logarithmic adder according to an embodiment of the present disclosure.

As described above, the neural network accelerator according to an embodiment of the present disclosure may perform a neural network operation by converting operations on a real domain into operations on the logarithm domain. For example, a neural network accelerator may perform an operation by converting a multiplication/division operation on the real domain into an addition/subtraction operation on the logarithm domain. Alternatively, the neural network accelerator may perform an operation by converting the addition/subtraction operation of the real domain into Jacobian logarithmic addition. In this case, the neural network accelerator may calculate the magnitude component $D_M$ and the sign component $D_S$ of the output data 'D' while the magnitude component $D_M$ and the sign component $D_S$ of the output data 'D', which is an operation result, are separated from each other. At this time, the magnitude component $D_M$ may be divided into a maximum value term and an offset term. The amount of computation may be reduced by approximating an operation for the offset term through saturation and quantization. In an embodiment, the operation for the offset term may be performed by separating the first offset and the second offset depending on a sign of the input data. Alternatively, the operation for the offset term may be performed by separating the first offset and the second offset according to the sign of the input data after approximating the exponential term of the offset term. In this case, calculation accuracy may be improved. Accordingly, a Jacobian logarithmic adder with improved performance and reduced cost and a neural network accelerator including the same may be provided.

A neural network accelerator may convert multiplication and addition on a real domain into logarithmic addition and Jacobian logarithmic addition, thereby reducing the amount of computation and hardware configuration of DNN. According to an embodiment of the present disclosure, a structure of a Jacobian logarithmic adder configured to implement Jacobian logarithmic addition may be provided. Accordingly, a neural network accelerator configured to perform an operation on a logarithm domain with improved performance and reduced cost is provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A neural network accelerator of a deep neural network (DNN), the neural network accelerator comprising a processor and software configured to implement:
a maximum value determiner configured to determine a maximum value for first input data and second input data, and output the maximum value based on a first magnitude component corresponding to the first input data and a second magnitude component corresponding to the second input data;
a sign determiner configured to determine a sign component corresponding to the maximum value and output the sign component corresponding to the maximum value among a first sign component corresponding to the first input data and a second sign component corresponding to the second input data, as an output sign component;
an offset operator configured to calculate an offset term as $\log_2(1+2^{-|A_M-B_M|})$ and $\log_2(1-2^{-|A_M-B_M|})$, based on the first magnitude component and the second magnitude component, quantize a difference between the first magnitude component and the second magnitude component, and output an output offset based on the first sign component, the second sign component, and a quantization result, wherein $A_M$ is the first magnitude component and $B_M$ is the second magnitude component; and
a magnitude operator configured to calculate an output magnitude component of output data based on the maximum value and the output offset and output the output magnitude component as a sum of the maximum value and output offset,
wherein each of the first input data and the second input data is data in a logarithm domain, and
wherein the processor converts mathematical operations in the real domain to mathematical operations on the first input data and the second input data in the logarithmic domain, thereby reducing an amount of computation and hardware configuration of the DNN.

2. The neural network accelerator of claim 1, further comprising:
a complement generation unit configured to generate a complement of third input data; and
a first multiplexer configured to select one of the third input data and the generated complement as the second input data in response to a subtraction signal.

3. The neural network accelerator of claim 1, wherein the offset operator includes:
a minimum value determiner configured to output a minimum value among the first magnitude component and the second magnitude component;
a first integer separation unit configured to output a first integer and a first decimal based on a difference between the minimum value and the maximum value;
a first quantization unit configured to output a first quantization value by saturating and quantizing the first integer and the first decimal;
a first lookup table configured to output a first offset value corresponding to the first quantization value;
a second quantization unit configured to output a second quantization value by saturating and quantizing the first integer and the first decimal;
a second lookup table configured to output a second offset value corresponding to the second quantization value; and
an offset selector configured to output one of the first offset value and the second offset value as the output offset based on a comparison result between the first sign component and the second sign component by the sign determiner.

4. The neural network accelerator of claim 3, wherein the first offset value and the second offset value are represented by Equation 1.

$$OS_1 = \log_2 1 + 2^{Q_1}$$
$$OS_2 = \log_2 1 - 2^{Q_2} \quad \text{[Equation 1]}$$

In the Equation 1, $OS_1$ denotes the first offset value; $Q_1$ denotes the first quantization value; $OS_2$ denotes the second offset value; $Q_2$ denotes the second quantization value.

5. The neural network accelerator of claim 4, wherein the offset selector selects the first offset value as the output offset when the first sign component is identical to the second sign component, and
wherein the offset selector selects the second offset value as the output offset when the first sign component is different from the second sign component.

6. The neural network accelerator of claim 1, wherein the offset operator includes:
a minimum value determiner configured to output a minimum value among the first magnitude component and the second magnitude component;
a first operating unit configured to generate a first intermediate value based on a difference between the minimum value and the maximum value;
a second operating unit configured to generate a first offset value based on the first intermediate value;
a third operating unit configured to generate a second offset value based on the first intermediate value; and
an offset selector configured to output one of the first offset value and the second offset value as the output offset based on a comparison result between the first sign component and the second sign component by the sign determiner.

7. The neural network accelerator of claim 6, wherein the first operating unit includes:
a first integer separation unit configured to output a first integer and a first decimal based on a difference between the minimum value and the maximum value;
a first quantization unit configured to output a first quantization value by quantizing the first decimal;
a first lookup table configured to output a first value corresponding to the first quantization value; and
a bit shifter configured to output the first intermediate value by performing bit-shift on the first value based on the first integer,
wherein the first value is represented by Equation 2.

$$V_1 = 2^{-|A_M - B_M|} \quad \text{[Equation 2]}$$

wherein in the Equation 2, $V_1$ is the first value, $A_M$ is the first magnitude component; $B_M$ is the second magnitude component.

8. The neural network accelerator of claim 7, wherein the second operating unit includes:
- a second integer separation unit configured to output a second integer and a second decimal based on a sum of the first intermediate value and '1';
- a second quantization unit configured to output a second quantization value by quantizing the second decimal;
- a second lookup table configured to output a first intermediate offset value based on the second quantization value; and
- a first multiplexer configured to output one of the first intermediate offset value and '1' as the first offset value based on the second integer.

9. The neural network accelerator of claim 8, wherein the first multiplexer selects and outputs the '1' as the first offset value when the second integer is '1', and
wherein the first multiplexer selects and outputs the first intermediate offset value as the first offset value when the second integer is '0'.

10. The neural network accelerator of claim 8, wherein the third operating unit includes:
- a third integer separation unit configured to output a third integer and a third decimal based on a difference between the first intermediate value and '1';
- a third quantization unit configured to output a third quantization value by quantizing the third decimal;
- a third lookup table configured to output a second intermediate offset value based on the third quantization value; and
- a second multiplexer configured to output one of the second intermediate offset value and '0' as the second offset value based on the third integer.

11. The neural network accelerator of claim 10, wherein the second multiplexer selects and outputs the second intermediate offset value as the second offset value when the second integer is '1', and
wherein the second multiplexer selects and outputs the '0' as the second offset value when the second integer is '0'.

12. A neural network accelerator of a deep neural network (DNN), the neural network accelerator comprising:
- a log converter configured to convert real number data on a real domain into log data on a logarithm domain, thereby reducing an amount of computation and hardware configuration of the DNN; and
- an operation circuit configured to convert a multiplication operation on the real domain and a division operation on the real domain for the real number data into logarithmic addition and logarithmic subtraction for the log data and to convert addition on the real domain for the real number data into Jacobian logarithmic addition for the log data, wherein the operation circuit includes a Jacobian logarithmic adder configured to perform the Jacobian logarithmic addition, wherein the Jacobian logarithmic adder includes:
- a maximum value determiner configured to determine a maximum value for first log data and second log data, and output the maximum value based on a first magnitude component corresponding to the first log data and a second magnitude component corresponding to the second log data;
- a sign determiner configured to determine a sign component corresponding to the maximum value and output the sign component corresponding to the maximum value among a first sign component corresponding to the first log data and a second sign component corresponding to the second log data, as an output sign component;
- an offset operator configured to calculate an offset term as $\log_2(1+2^{-|A_M-B_M|})$ and $\log_2(1-2^{-|A_M-B_M|})$, based on the first magnitude component and the second magnitude component, quantize a difference between the first magnitude component and the second magnitude component, and output an output offset based on the first sign component, the second sign component, and a quantization result, wherein $A_M$ is the first magnitude component and $B_M$ is the second magnitude component; and
- a magnitude operator configured to calculate an output magnitude component of an output data based on the maximum value and the output offset and output the output magnitude component as a sum of the maximum value and output offset.

* * * * *